Figure 1:
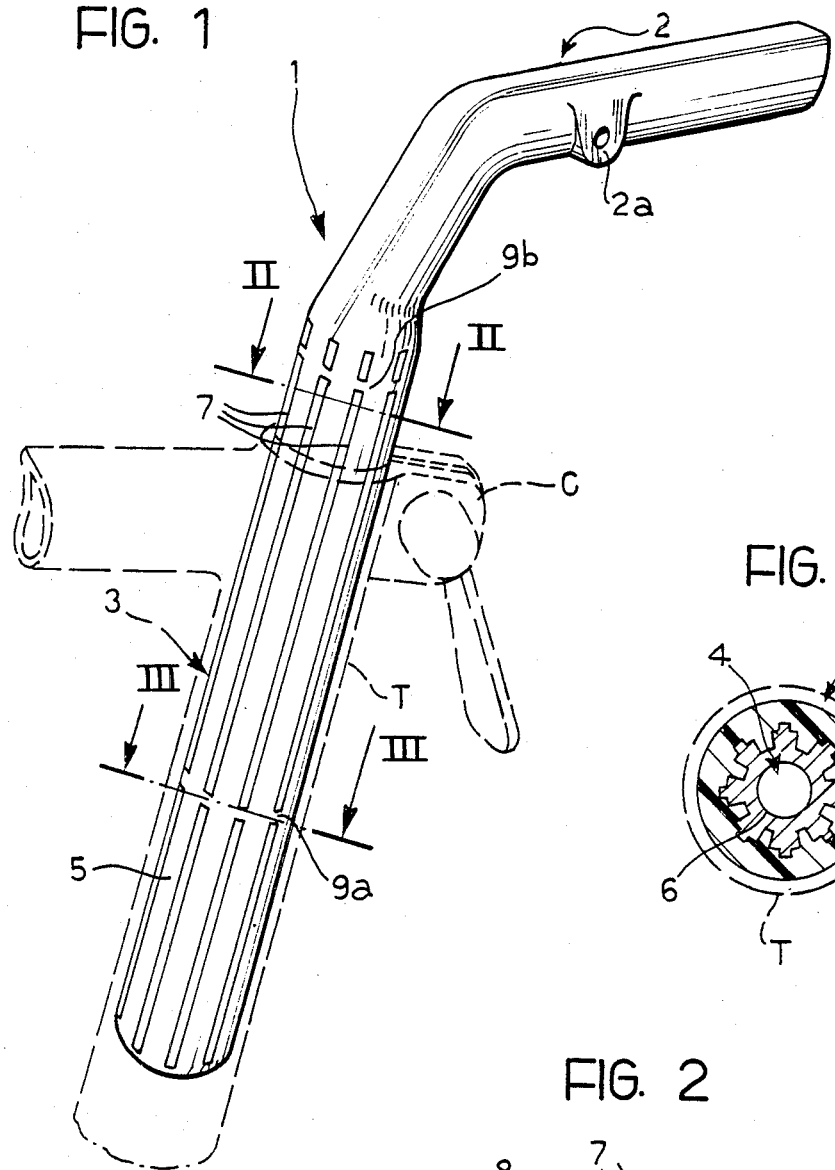

United States Patent [19]

Borromeo

[11] Patent Number: 4,826,192
[45] Date of Patent: May 2, 1989

[54] SADDLE PILLAR MEMBER FOR CYCLES, WITH A METAL CORE

[75] Inventor: Lucio Borromeo, Turin, Italy

[73] Assignee: 3 T S.p.A., Turin, Italy

[21] Appl. No.: 79,973

[22] Filed: Jul. 31, 1987

[30] Foreign Application Priority Data

Jan. 12, 1987 [IT] Italy ............................. 52824/87[U]

[51] Int. Cl.⁴ ......................... B62K 19/36; B62J 1/08
[52] U.S. Cl. ............................ 280/281.1; 29/525.1; 248/157; 248/158; 248/161; 296/205; 297/195; 297/203; 428/35.8
[58] Field of Search ............. 428/36; 280/281 R, 274; 29/526 R; 297/195, 203; 296/205; 248/161, 157, 158, 231.3, 316.2

[56] References Cited

U.S. PATENT DOCUMENTS 3,972,529 8/1976 McNeil ................................ 428/36
4,233,731 11/1980 Clabburn et al. ..................... 428/36

FOREIGN PATENT DOCUMENTS 2418741 11/1979 France.
102419 8/1941 Sweden.
126649 11/1949 Sweden.

Primary Examiner—Ellis P. Robinson
Assistant Examiner—Archene Turner
Attorney, Agent, or Firm—Sughrue, Mion, Zinn, Macpeak, and Seas

[57] ABSTRACT

A saddle pillar member for cycles, comprising a cylindrical portion intended to be slidably inserted into a tube of the cycle frame and able to be locked in a selectively determined position within this tube by a clamping action exerted on the external surface of the cylindrical portion, and consisting of a metal core having peripheral parts which appear the external surface of the cylindrical portion, and a mass of plastics material applied to this core to complete the cylindrical portion.

2 Claims, 1 Drawing Sheet

SADDLE PILLAR MEMBER FOR CYCLES, WITH A METAL CORE

The present invention refers to saddle pillar members (tubes) for cycles and relates in particular to a saddle pillar member (tube) comprising a cylindrical portion intended to be slidably inserted into a tube of the cycle frame and able to be locked in a selectively determined position within this tube by a clamping action exerted on the external surface of the cylindrical portion.

In recent years, the manufacture of these members, and particularly the manufacture of the external parts thereof, has made increasing use of plastics materials, the so-called technopolymers, which combine good structural strength with the typical characteristics of plastics materials, such as ease of moulding, good resistance to atmospheric agents, etc.

The presence of a plastics material on the external surface of the cylindrical portion or support of a saddle pillar member often creates difficulties due to the fact that, even when quite tightly clamped, the plastics-covered surface tends to slide relative to the tube of the cycle frame, so that the saddle pillar member and the saddle supported thereby tend to move downwards under the weight of the cyclist.

The object of the present invention is to provide a saddle pillar member which has all the advantageous characteristics deriving from the use of plastics materials, but avoids the aforesaid practical difficulty.

According to the present invention, this object is achieved by virtue of a saddle pillar member of the type specified above, characterised in that it comprises:

a metal core having peripheral parts which appear on the external surface of the cylindrical portion, and a mass of plastics material applied to this core to complete the cylindrical portion.

Figure 3:
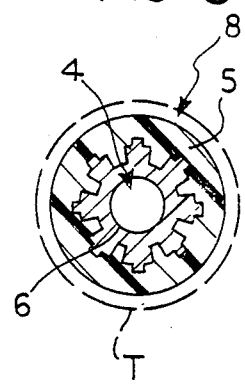
Figure 2:
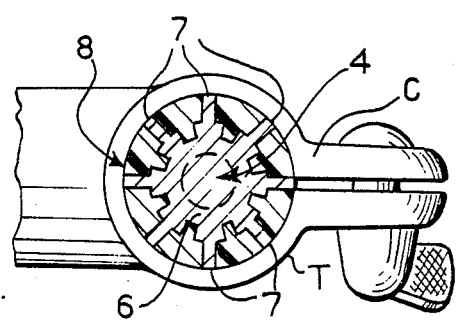

Further characteristics and advantages of the invention will be seen from the description which follows, purely by way of non-limiting example, with reference to the appended drawings, in which:

FIG. 1 is a general perspective view of a saddle pillar member according to the invention, and FIGS. 2 and 3 are two sectional views taken on the lines II—II and III—III of FIG. 1 respectively.

In FIG. 1, a saddle pillar member (tube) for cycles is generally indicated 1. The overall shape of this member, as well as its criteria for use, can be considered as known and therefore will not be explained further in the present specification, it not being relevant to the understanding of the invention.

For this purpose, it is sufficient to note that the member 1 is generally L-shaped and includes:

an upper arm 2 which, in use, extends in a substantially horizontal direction and is provided with attachments 3 for mounting a saddle (not illustrated), and a lower cylindrical support portion 3 intended to be slidably engaged within a tube (or sleeve) T of the metal frame of the cycle, schematically illustrated by broken lines in FIG. 1.

Clamping means, such as, for example, a C-collar which can be selectively tightened by the movement of an operating lever L, are used to clamp the tube T around the cylindrical portion 3 of the member 1, once its position within the tube T has been adjusted to the saddle height selected by the cyclist.

The member 1 consists substantially of a generally L-shaped metal core 4 and a mass of plastics material 5 (for example, the technopolymer sold by the Bayer Company under the commercial name of Zytel) applied to the core 4 to cover it and define overall the external surface of the saddle pillar member 1.

In correspondence with the cylindrical portion 3, and for all of its length, the core 4 has a generally star-shaped structure. It can thus be seen to comprise a central part 6 which also extends with a curved development into the upper part 2, and a plurality of branches or arms 7 which branch out from the core 4 so that their free ends appear on the external surface of the cylindrical portion 3, indicated 8 in FIGS. 2 and 3.

The branches or arms 7 extend substantially continuously along the whole axial length of the cylindrical portion 3 of the core 4. The external surface 8 of the cylindrical portion 3 therefore has a generally striped appearance, consisting of alternating strips of plastics material and surface strips of metal which separate the strips of plastics material.

When the saddle pillar member is inserted into the tube T of the frame for subsequent clamping therein by, tightening of the C-ring, the metallic material of the tube T, as well as being forced against the strips of plastics material, is also forced against the strips of metal which appear on the external surface 8.

By virtue of the metal-to-metal contact which occurs, the retention of the member 1 within the tube T is much firmer than that obtainable in the case of an external surface 8 which is covered wholly in plastics material.

In this way, the undesirable practical problem of gradual slippage of the saddle pillar member 1 relative to the tube of the frame is avoided.

As stated, the branches or arms 7 of the core 4 extend continuously for practically the whole axial length of the cylindrical portion 3. To advantage, however, in correspondence with two annular zones 9a and 9b of the portion 3 (see particularly the section of FIG. 3, taken in correspondence with the annular zone 9b), they may have notches which are covered by the mass of plastics material 5. The metal strips which appear on the external surface of the portion 3 therefore have two annular zones of discontinuity corresponding to the zones 9a and 9b.

The position of these zones in relation to the region 3 is selected in such a way that the zones themselves correspond to the positions of maximum and minimum permitted insertion of the member 1 into the tube of the frame.

In other words, the notches provided in the branches 7 form two reference strips which allow the cyclist to identify precisely the positions of maximum raising and maximum lowering of the saddle permitted by the member 1. A supplementary painting or anodising operation to make corresponding reference marks on the outside of the saddle pillar member 1 can thus be avoided.

I claim:

1. A saddle pillar member for cycles including a cylindrical portion adapted to be slidably inserted into a tube of a cycle frame and adapted to be locked in a selectively determined position within said tube by a clamping action exerted on the external surface thereof, said cylindrical portion comprising:

a metal core having a plurality of radially extending axially elongated arms having peripheral end portions forming a portion of the external surface of said cylindrical portion and a mass of plastics material applied to said core between said arms to complete the external surface of said cylindrical portion.

2. A saddle pillar member according to claim 1, wherein said arms extend continuously in an axial direction with respect to the cylindrical portion and are provided in two spaced apart annular zones of said cylindrical portion with notches filled with said mass of plastics material to provide continuous annular rings of plastics material identifying respectively the positions of maximum and minimum insertion of the cylindrical portion into the tube of the frame.

* * * * *